US012729822B2

(12) United States Patent
Wilhelm et al.

(10) Patent No.: US 12,729,822 B2
(45) Date of Patent: Sep. 8, 2026

(54) LOW BEAM HEADLIGHT WITH BEAM FORMING OPTICS FOR GENERATING A LIGHT DARK DISTRIBUTION WITH OBLIQUE EXTENDING EDGES

(71) Applicants: Fraunhofer-Gesellschaft zur Förderung der angewandten Forschung e.V., Munich (DE); Friedrich-Schiller-Universität Jena, Jena (DE)

(72) Inventors: Leo Maximilian Wilhelm, Jena (DE); Peter Schreiber, Jena (DE); Dmitrii Stefanidi, Jena (DE)

(73) Assignees: Fraunhofer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 0 days.

(21) Appl. No.: 19/087,515

(22) Filed: Mar. 23, 2025

(65) Prior Publication Data

US 2025/0216045 A1 Jul. 3, 2025

Related U.S. Application Data

(63) Continuation of application No. PCT/EP2023/076268, filed on Sep. 22, 2023.

(30) Foreign Application Priority Data

Sep. 23, 2022 (DE) ..................... 10 2022 210 092.1

(51) Int. Cl.
*F21S 41/27* (2018.01)

(52) U.S. Cl.
CPC .................................... *F21S 41/27* (2018.01)

(58) Field of Classification Search
CPC .. F21S 41/20; F21S 41/24; F21S 41/25; F21S 41/255; F21S 41/26; F21S 41/265;
(Continued)

(56) References Cited

U.S. PATENT DOCUMENTS 11,193,643 B2 * 12/2021 Kemetmüller ........ F21S 41/265
2015/0252975 A1 9/2015 Nakada
(Continued)

FOREIGN PATENT DOCUMENTS

AT 514967 B1 8/2015
DE 102017217345 B4 3/2019
(Continued)

OTHER PUBLICATIONS

International Search Report in International application No. PCT/EP2023/076268,mailed on Jan. 29, 2024.
(Continued)

*Primary Examiner* — Robert J May
(74) *Attorney, Agent, or Firm* — PV IP PC; Wei Te Chung

(57) ABSTRACT

A low-beam headlight includes a light source arrangement for generating a light cone consisting of light that is less divergent in a first transverse direction than in a second transverse direction perpendicular to the first transverse direction. The low-beam headlight includes beamforming optics for generating, on the basis of light, a light/dark distribution comprising a light/dark edge extending obliquely at least in portions with respect to the first transverse direction and the second transverse direction, wherein the beamforming optics comprises a condenser lens array for receiving incident light, and a projection lens array with a multitude of projection lenses for outputting light received by the condenser lens array. Compared to a second projection lens assigned to a second condenser lens of the first
(Continued)

column, a first projection lens assigned to a first condenser lens of the first column of the matrix is decentered differently with respect to the assigned condenser lens along the second transverse direction.

17 Claims, 12 Drawing Sheets

(58) Field of Classification Search
CPC .......... F21S 41/27; F21S 41/275; F21S 41/28; F21S 41/2805; F21S 41/285; F21S 41/29; F21S 41/295
See application file for complete search history.

(56) References Cited

U.S. PATENT DOCUMENTS

| | | | | |
|---|---|---|---|---|
| 2019/0301699 | A1 | 10/2019 | Fischer | |
| 2020/0332977 | A1 | 10/2020 | Miedler et al. | |
| 2021/0215314 | A1 | 7/2021 | Schreiber et al. | |
| 2021/0231280 | A1* | 7/2021 | Schreiber .............. | F21S 41/265 |

FOREIGN PATENT DOCUMENTS

| | | | |
|---|---|---|---|
| DE | 102018217215 | A1 | 4/2020 |
| DE | 102020126716 | A1 | 4/2022 |
| EP | 0738903 | A1 | 10/1996 |
| EP | 3499115 | A1 | 6/2019 |
| EP | 4040040 | A1 | 8/2022 |
| JP | 2015170423 | A | 9/2015 |
| JP | 2021051897 | A | 4/2021 |
| JP | 2021189306 | A | 12/2021 |
| JP | 2022504491 | A | 1/2022 |
| WO | 2008043491 | A2 | 4/2008 |
| WO | 2020030573 | A1 | 2/2020 |
| WO | 2020074523 | A1 | 4/2020 |
| WO | 2021151711 | A1 | 8/2021 |

OTHER PUBLICATIONS

Written Opinion of the International Search Authority in International application No. PCT/EP2023/076268,mailed on Jan. 29, 2024.
The Second Written Opinion of the International Search Authority in International application No. PCT/EP2023/076268,mailed on Sep. 3, 2024.
International Preliminary Report on Patentability in International application No. PCT/EP2023/076268, dated Jan. 7, 2025.
Li Chen et al.: "Etendue conserving light shaping using microlens arrays with irregular lenslets", in: Illumination Optics V: May 14-16, 2018, Frankfurt, Germany. Bellingham, Wash. : SPIE, 2018 (Proceedings of SPIE ; 1069304).
Schreiber Peter, Wilhelm, Leo M.: Light shaping with micro-optical irregular fly's eye condensers. In: International Optical Design Conference, Jun. 27-Jul. 1, 2021, Washington, DC, United States. Bellingham, Wash.: SPIE, 2021 (Proceedings of SPIE; 12078), IODC 2021.
Office Action for Invention issued in corresponding JP patent application No. 2025-517387 dated Apr. 21, 2026, pp. 4-7.

* cited by examiner

LOW BEAM HEADLIGHT WITH BEAM FORMING OPTICS FOR GENERATING A LIGHT DARK DISTRIBUTION WITH OBLIQUE EXTENDING EDGES

CROSS-REFERENCES TO RELATED APPLICATIONS

This application is a continuation of copending International Application No. PCT/EP2023/076268, filed Sep. 22, 2023, which is incorporated herein by reference in its entirety, and additionally claims priority from German Application No. DE 10 2022 210 092.1, filed Sep. 23, 2022, which is incorporated herein by reference in its entirety.

The present invention relates to implementations of low-beam headlights, in particular for motor vehicles, as well as to motor vehicles with such a low-beam headlight. Furthermore, the present invention relates to methods for manufacturing low-beam headlights.

BACKGROUND OF THE INVENTION

Essential features of the intensity distribution of a low-beam light for motor vehicles are a distribution that is approximately symmetrical in the horizontal direction with a full divergence of approximately +/−30° and a half width of approximately 8 . . . 10° as well as an asymmetrical vertical distribution in the range of approximately −12° . . . 0° with a half width of approximately 2 . . . 3° and a light/dark border (or cut-off line) that is sharp towards the upper side and has high contrast to avoid blinding of oncoming vehicles, and a gentle reduction in brightness towards the bottom side.

FIG. 10 shows the light/dark border on the right in the direction of travel in the case of in right-hand traffic. On the right side, it forms a horizontal line approximately on the horizon and on the left side slightly below. In the "elbow-shoulder region", these two horizontal lines are connected by a rising line. The maximum of the light distribution is located to the right of the vertical axis, below the horizon.

Generating this complex intensity distribution needs large headlight systems with a comparatively low transmission. The light-dark boundary is generated by imaging a suitably shaped diaphragm illuminated by a beam-shaped light source (usually a LED or halogen lamp). This diaphragm decreases the system transmission.

A multi-channel micro-optical realization corresponding to this design approach using lens arrays was disclosed in [1]: Several individually collimated LEDs illuminating a condenser micro-lens array (input array), followed by a diaphragm array and a projection lens array (output array), are used as a light source. By switching from conventional single aperture optics to multi-aperture optics, the focal length of the projection optics and therefore the structural length of the headlight may be shortened significantly. However, the system transmission is still limited by the diaphragm array. The absorbing diaphragms also ensure a noticeable heat input into the micro-optics.

An alternative variation [2] is based on beam shaping using irregular, micro-optical honeycomb condensers [3,4]: here, three honeycomb condensers arranged next to each other are illuminated by a light source collimated in a vertical direction. The three microlens arrays are each responsible for illuminating the left (light/dark border below the horizon), central (elbow-shoulder region), and right (light/dark border on the horizon) honeycomb condensers of the far-field. Advantageously, the left and right arrays are implemented as cylinder lens and the central array is implemented with spherical, rectangular-edged lenslets with buried diaphragms to generate the elbow-shoulder distribution. The disadvantages of this system layout are as follows:

- residual diaphragms still present in the central area according to implementation [2],
- a vertically blurred image of the light/dark border of the elbow-shoulder region occurring within the light distribution below the hotspot in the implementation without diaphragms [2],
- interfering light artifacts created at the joints between adjacent honeycomb condensers, and.
- limited controllability of the horizontal intensity distribution in the outer areas on the right and left sides exclusively by the horizontal far-field distribution of the collimated light source.

On the basis of the above, there is a need to provide a possibility to avoid the above-mentioned disadvantages and to enable a sharp image of the light/dark border in good quality, without the need to use a diaphragm.

The object of the present invention is to provide a possibility to sharply image a light/dark border in low-beam headlights in good quality, while avoiding the need to use a diaphragm.

SUMMARY

An embodiment may have a low-beam headlight, comprising: beamforming optics for generating, on the basis of light, a light/dark distribution comprising a light/dark edge extending obliquely at least in portions with respect to a first transverse direction and a second transverse direction perpendicular thereto, wherein the beamforming optics comprises a condenser lens array for receiving incident light; and a projection lens array with a multitude of projection lenses for outputting light received by the condenser lens array; wherein the condenser lens array comprises a plurality of condenser lenses arranged in a matrix arrangement with several columns and several lines, wherein condenser lenses of at least a first column are adapted to the obliquely-extending light/dark edge; wherein, compared to a second projection lens assigned to a second condenser lens of the first column, a first projection lens assigned to a first condenser lens of the first column of the matrix is decentered differently with respect to the assigned condenser lens along the second transverse direction.

Another embodiment may have a low-beam headlight, comprising: a light source arrangement for generating a light cone of light that is less divergent in a first transverse direction than in a second transverse direction perpendicular to the first transverse direction; and with beamforming optics for generating, on the basis of light, a light/dark distribution comprising a light/dark edge extending obliquely at least in portions with respect to the first transverse direction and the second transverse direction, wherein the beamforming optics comprises a condenser lens array for receiving incident light; and a projection lens array with a multitude of projection lenses for outputting light received by the condenser lens array; wherein the condenser lens array comprises a plurality of condenser lenses arranged in a matrix arrangement with several columns and several lines, wherein condenser lenses of at least a first column are adapted to the obliquely-extending light/dark edge; wherein condenser lenses of the first column each comprise a first and an opposite second boundary edge extending along the first and second transverse directions and comprising at least one bend and extending obliquely at least in portions, adapted to the obliquely-extending light/dark edge in such a way; wherein, in at least one condenser lens, a bend of the first boundary edge is arranged so as to be offset with respect to a corresponding bend of the second boundary edge along the second transverse direction; or with a micro-optical beamformer without diaphragms, comprising a first condenser lens array with condenser lenses arranged in columns of identical width and rows of individually different height so as to fill the area, the condenser lenses being formed at least partially as lens segments decentered along the first transverse direction; and a second projection lens array arranged behind the same along a light propagation direction, comprising at least partially decentered projection lenses, and comprising a greater pitch along the second transverse direction than the condenser lens array and an equal pitch along the first transverse direction, wherein each condenser lens images the light source into a projection lens assigned thereto, and each projection lens images the assigned condenser lens towards infinity; and thus forms a far-field distribution of the low-beam; wherein beamforming of the beamformer along the second transverse direction results at least in part from an interaction of a divergence distribution of the collimated light source arrangement along the second transverse direction and the beamforming of the lens arrays along the second transverse direction; wherein condenser lenses are equipped with a corresponding bend in boundaries opposite along the first transverse direction in a central area of the condenser lens array to generate an elbow-shoulder contour of a light/dark border in the far-field distribution; and the positions of the bends along the second transverse direction are different for at least a subset of the condenser lenses of a condenser lens array column, and the assigned projection lenses comprise lens segments with different decentered arrangements along the second transverse direction.

Another embodiment may have a beamforming optics for generating, on the basis of incident light, a light/dark distribution comprising a light/dark edge extending obliquely at least in portions with respect to a first transverse direction and a second transverse direction perpendicular thereto, wherein the beamforming optics comprises: a condenser lens array for receiving the incident light; and a projection lens array with a multitude of projection lenses for outputting light received by the condenser lens array; wherein the condenser lens array comprises a plurality of condenser lenses arranged in a matrix arrangement with several columns and several lines, wherein condenser lenses of at least a first column are adapted to the obliquely-extending light/dark edge; wherein, compared to a second projection lens assigned to a second condenser lens of the first column, a first projection lens assigned to a first condenser lens of the first column of the matrix is decentered differently with respect to the assigned condenser lens along the second transverse direction.

According to an embodiment, a low-beam headlight includes beamforming (or beamshaping) optics (or optical system) for generating, on the basis of incident light, a light/dark distribution comprising a light/dark edge (or boundary) extending obliquely at least in portions with respect to the first transverse direction and the second transverse direction, wherein the beamforming optics comprises a condenser lens array for receiving the incident light, and a projection lens array with a multitude of projection lenses for outputting light received by the condenser lens array. The condenser lens array includes a plurality of condenser lenses arranged in a matrix arrangement with several columns and several lines, wherein condenser lenses of at least a first column are adapted to the obliquely-extending light/dark edge. Compared to a second projection lens assigned to a second condenser lens of the first column, a first projection lens assigned to a first condenser lens of the first column of the matrix is decentered differently with respect to the assigned condenser lens along the second transverse direction. This decentered arrangement enables positioning of interference light artifacts at different positions in the second transverse direction so that a sharp image without excessively interfering artifacts may be obtained even without diaphragms.

An embodiment includes beamforming optics for generating, on the basis of incident light, a light/dark distribution comprising a light/dark edge extending obliquely at least in portions with respect to a first transverse direction and a second transverse direction perpendicular thereto, wherein the beamforming optics includes a condenser lens array for receiving the incident light, and a projection lens array with a multitude of projection lenses for outputting light received by the condenser lens array. The condenser lens array includes a plurality of condenser lenses arranged in a matrix arrangement with several columns and several lines, wherein condenser lenses of at least a first column are adapted to the obliquely-extending light/dark edge. Compared to a second projection lens assigned to a second condenser lens of the first column, a first projection lens assigned to a first condenser lens of the first column of the matrix is decentered differently with respect to the assigned condenser lens along the second transverse direction.

According to a further embodiment, alternatively or additionally to the individual decentered arrangement, in the low-beam headlight, condenser lenses of the first column each comprise a first and an opposite second boundary edge comprising at least one bend and extending obliquely at least in portions and along the second traversal direction, and that are adapted to the obliquely-extending light/dark edge in such a way. In at least one condenser lens, a bend of the first boundary edge is arranged so as to be offset to a corresponding bend of the second boundary edge along the second transverse direction. This also enables a sharp image of the light/dark edge without the need of a diaphragm arrangement, while avoiding interfering light artifacts.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
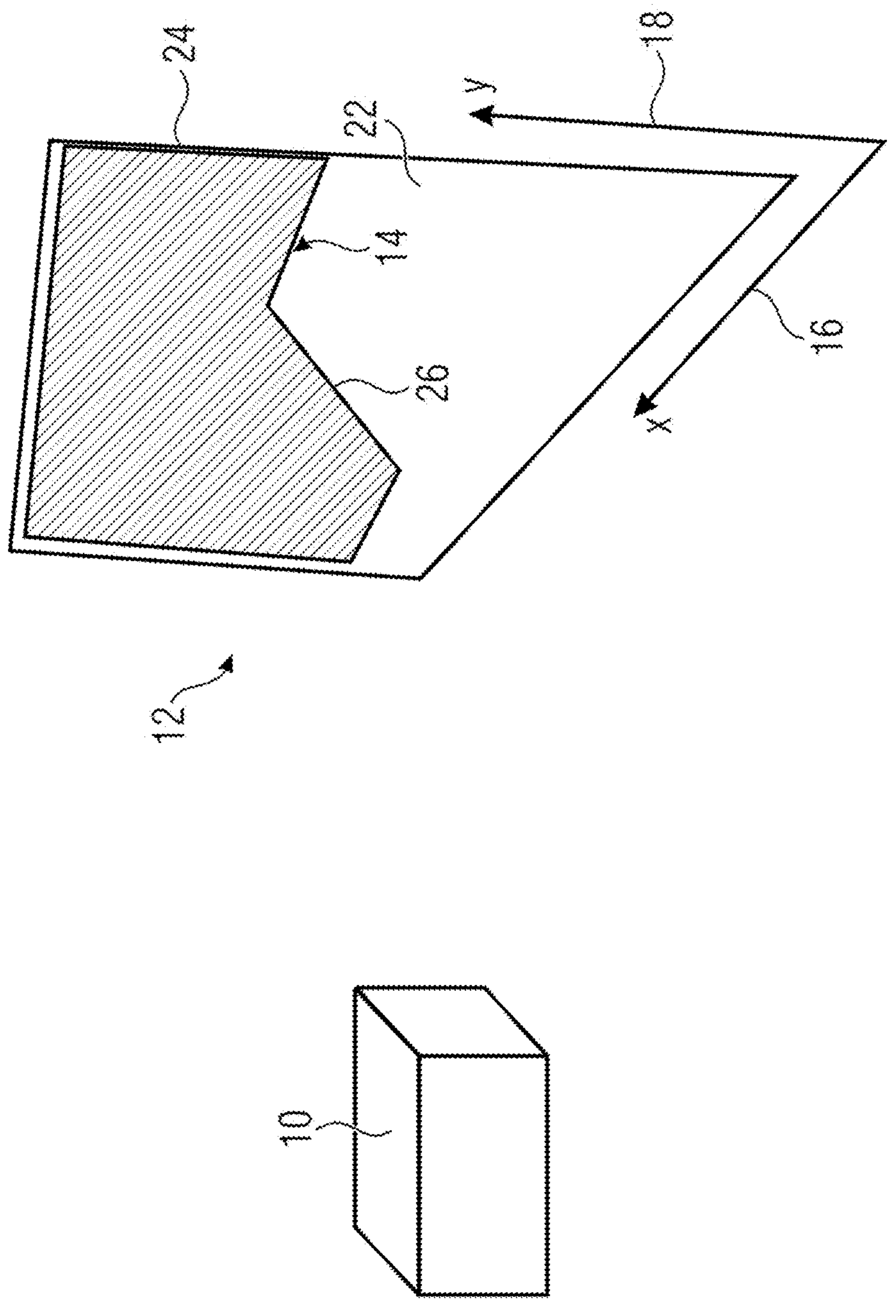
FIG. 1 shows a schematic perspective spatial view of a low-beam headlight according to an embodiment.

Before describing embodiments of the present invention in detail on the basis of the drawings, it is to be noted that identical and functionally identical elements, objects and/or structures or elements, objects and/or structures having the same effect are provided with the same reference numerals in the different drawings so that the description of these elements illustrated/represented in different embodiment is interchangeable or may be applied to one another.

Subsequently described embodiments are described in connection with a multitude of details. However, embodiments may also be implemented without these detailed features. Furthermore, embodiments are described using block circuit diagrams as a replacement of a detailed illustration for the sake of comprehensibility. Furthermore, details and/or features of individual embodiments may be readily combined, as long as not explicitly mentioned otherwise.

Embodiments of the present invention concern implementations of the condenser lens array of a honeycomb condenser, possibly in connection with the respectively assigned projection lens.

Embodiments show a geometry of components with respect to automotive right-hand traffic, which may be mirrored for the use of the invention in left-hand traffic.

The following describes low-beam headlights with inventive beamforming optics. Such beamforming optics makes it possible to generate an advantageous light distribution regardless of whether a light source used for illuminating the beamforming optics is more divergent or less divergent along different transverse directions, wherein a greater divergence along the horizontal transverse direction than along the transverse direction arranged in parallel to a height direction, for example, enables a simple implementation of a headlight whose light cone might have to be broader across the width of the road than along the height direction.

FIG. 1 shows a schematic perspective spatial view of a low-beam headlight 10 according to an embodiment for generating low-beam light 12. A light distribution of the low-beam light 12 comprises a light/dark edge (or light/dark border or cut-off line) 14 and is illustrated along a second transverse direction 16, exemplarily indicated with x, and a first transverse direction 18, exemplarily indicated with y and arranged perpendicular to the first transverse direction. The illustration of the light/dark edge 14 is illustrated exemplarily for right-hand traffic and may separate a bright, illuminated area 22 from a comparably dark, less illuminated or non-illuminated area 24. The light/dark edge 14 may extend obliquely at least in areas, illustrated for an oblique portion 26.

Figure 2A:
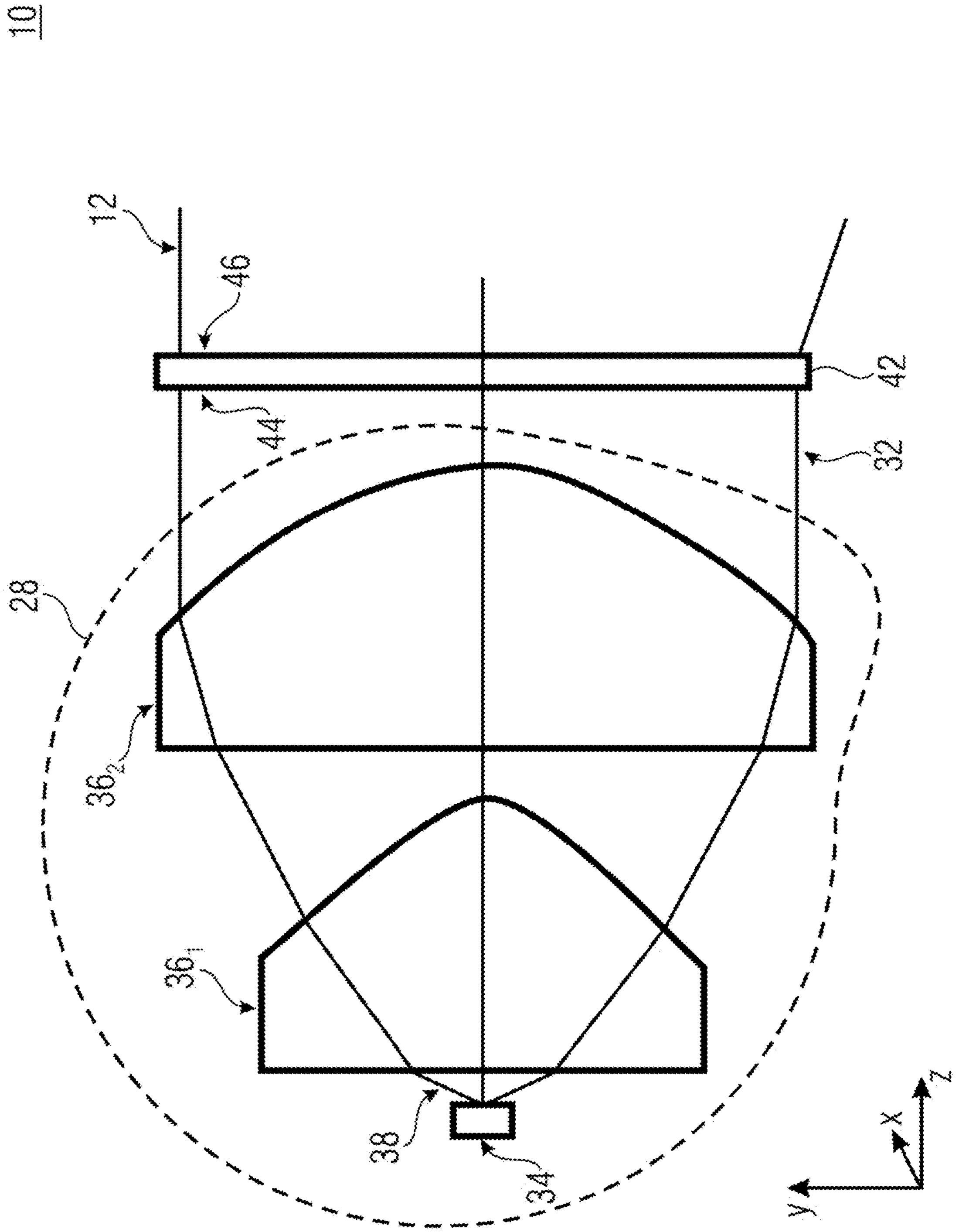
FIG. 2*a* shows a schematic side sectional view of an implementation of the low-beam headlight of FIG. 1.

FIG. 2*a* shows a schematic side sectional view of an implementation of the low-beam headlight 10 of FIG. 1. The low beam headlight may comprise a light source arrangement 28. If arranged, the same may be configured to provide a light cone 32. The light cone may be more divergent or less divergent along the first transverse direction y than along the second transverse direction x.

Figure 2B:
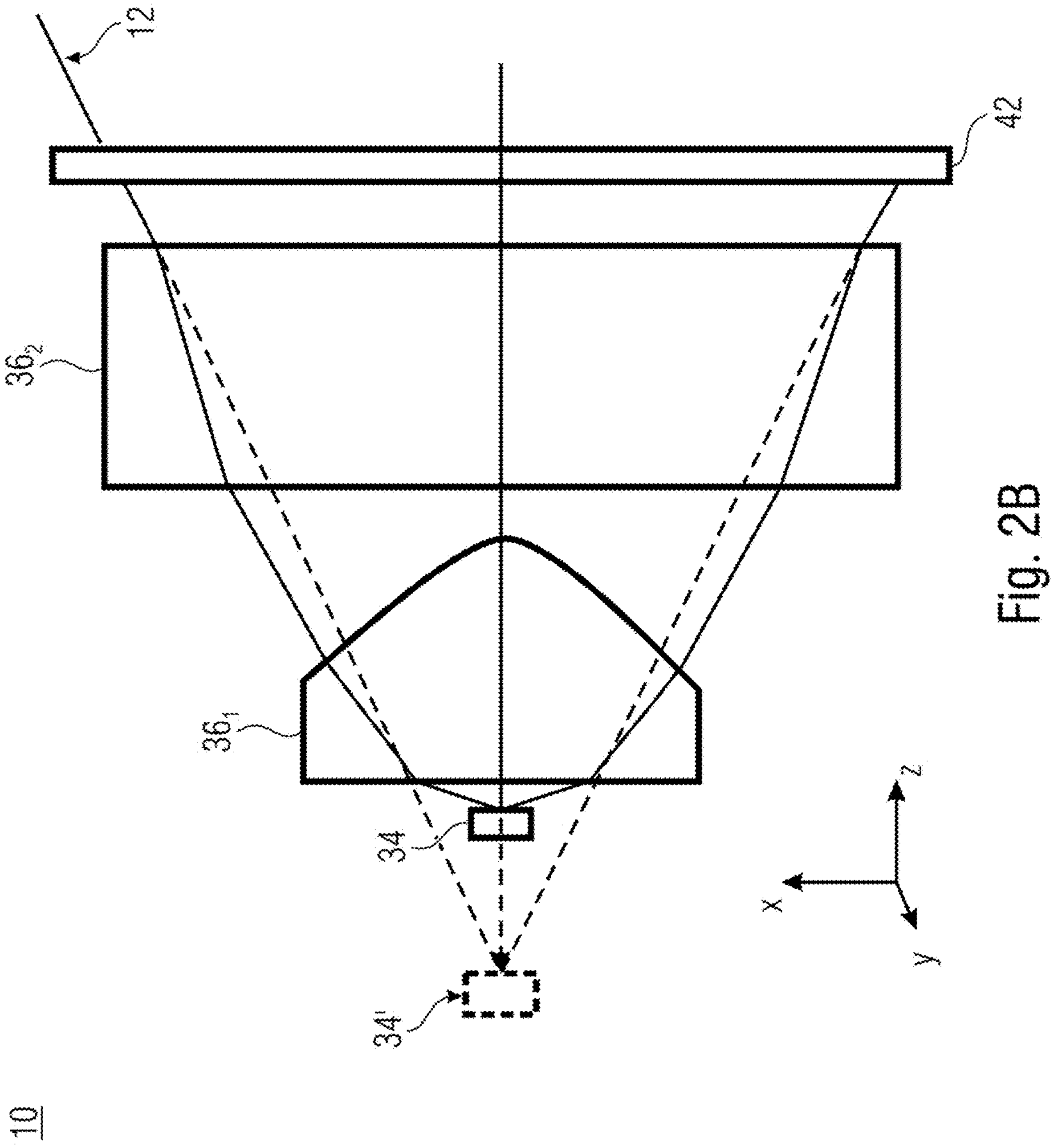
FIG. 2*b* shows a top view of the low-beam headlight corresponding to FIG. 2*a;*

FIG. 2*b* shows a top view of the low-beam headlight 10 corresponding to FIG. 2*a*, or the parts thereof illustrated in FIG. 2*a*. The divergences that differ along the transverse directions x and y may be obtained, e.g., by providing a divergently emitting light source 34, such as an LED, while any other suitable light sources may be readily employed as well. By means of downstream optics $\mathbf{36}_1$, such as an aspherical lens $\mathbf{36}_1$, e.g. a field lens arranged between the light source 34 and a collimator $\mathbf{36}_2$ for pre-collimation. The optics $\mathbf{36}_1$ may alternatively or additionally have other properties, e.g. by optionally providing a cylinder lens $\mathbf{36}_2$, so as to provide different degrees of collimation along the transverse directions x and y, which may create different divergences of the light source along the transverse directions. As illustrated in FIG. 2*b*, a field lens $\mathbf{36}_1$ may form (or shape) an enlarged virtual image 34' of the light source 34.

Furthermore, the low-beam headlight 10 includes beamforming optics 42 that may comprise a condenser lens array 44 and an oppositely arranged projection lens array 46. The beamforming optics 42 may also be provided without further components of the headlight and are configured to generate the light/dark edge 14, extending obliquely to the transverse directions x and y at least in portions, i.e. at least parts of the area 26, based on the light of the light cone 32. While condenser lenses of the condenser lens array 44 are configured to receive the incident light, projection lenses of the projection lens array 46 may be configured for outputting light received by the condenser lens array 44. To this end, e.g., a projection lens may be assigned to a condenser lens. The corresponding condenser lens of the condenser lens array 44 may be configured to image the light source, or light source arrangement, into the assigned projection lens, and the projection lens may be configured to image the condenser lens sharply, e.g. towards infinity. An implementation of the condenser lens array such that the same images the light source arrangement sharply into the projection lens array may enable Köhler illumination.

According to an embodiment, the light source arrangement 28 is configured to implement a light source radiating divergently into the transverse directions x and y by means of a collimator, such as the cylinder lens $\mathbf{36}_2$, for collimating divergent light and with different degrees of collimation along the transverse directions. Advantageously, the degree of collimation is higher along the first transverse direction y than along the second transverse direction x.

The collimator $\mathbf{36}_2$ may include a cylinder lens collimator or an acylindrical collimator or a toroidal collimator. Advantageously, the light source arrangement 28 is configured such that the light of the light cone 32 comprises a divergence that is more than 10 times larger along the transverse direction x than along the transverse direction y.

In other words, the low-beam light may include the collimated light source and a micro- optical beamformer (or beamshaper) 42. The collimated light source may fully or partially consist of an LED and secondary optics, corresponding to the source described in [2], wherein the secondary optics may possibly include a field lens and a collimation cylinder lens so as to provide an at least approximately full collimation in the vertical direction y, as shown in FIG. 2a. A restriction of the divergence by means of the field lens $\mathbf{36}_1$ may at least along occur the horizontal line x. The beamformer 42 may further include a condenser lens array 44 and a projection lens array 46 that are adjusted with respect to each other in the distance of a focal length and that may act as irregular honeycomb condensers.

The light source 34 exemplarily configured as an LED may be arranged within the single focal length of the field lengths $\mathbf{36}_1$, e.g. a hemispherical lens or a sphere or even an anamorphic lens, to increase the aperture angle and forming of the angular distribution. Accordingly, the field lens may form an enlarged virtual image 34' of the light source 34 and decrease the beam divergence. According to an example, the subsequently arranged lens $\mathbf{36}_2$, such as a cylinder lens, may collimate the radiation only along the vertical direction and may leave the horizontal angular distribution mostly as is, wherein a differently adjusted implementation of the optics may be implemented without any problems. An implementation of the collimator as an anamorphic lens with optional aspherical profiles in one or both spatial directions may contribute to the increase of the opening angle, aberration correction, and/or possibly to the control of the horizontal angular distribution.

Before explaining details with respect to the implementation of the beamforming optics 42, the interaction between the condenser lens array 44 and the projection lens array 46 is explained first. The beamforming optics 42 includes a tandem array of irregular predominately rectangularly edged lenslets or lenses, with approximately the same focal length, arranged in a distance of one focal length in the light propagation direction, such as z, with respect to each other.

Figure 3B:
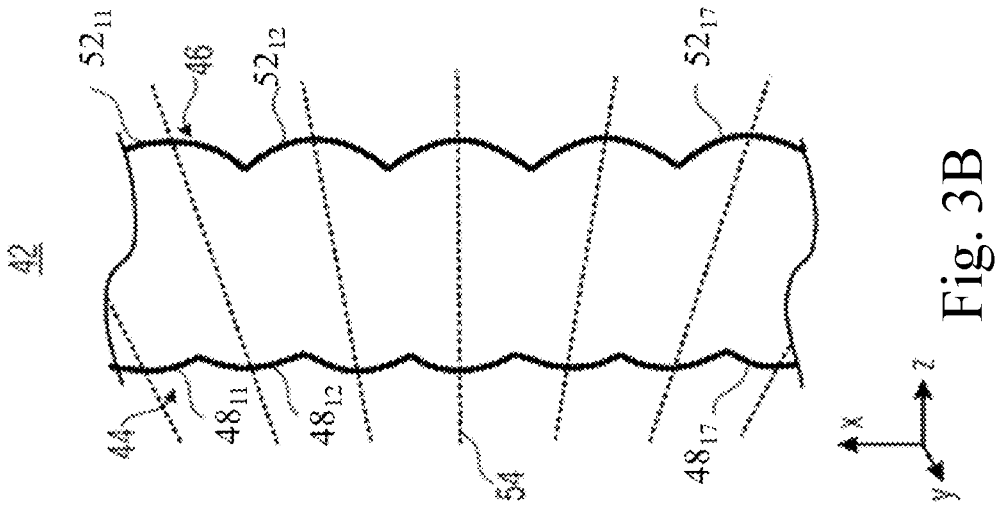
FIG. 3*b* shows a schematic top view of the beamforming optics of FIG. 3*a;*
Figure 3A:
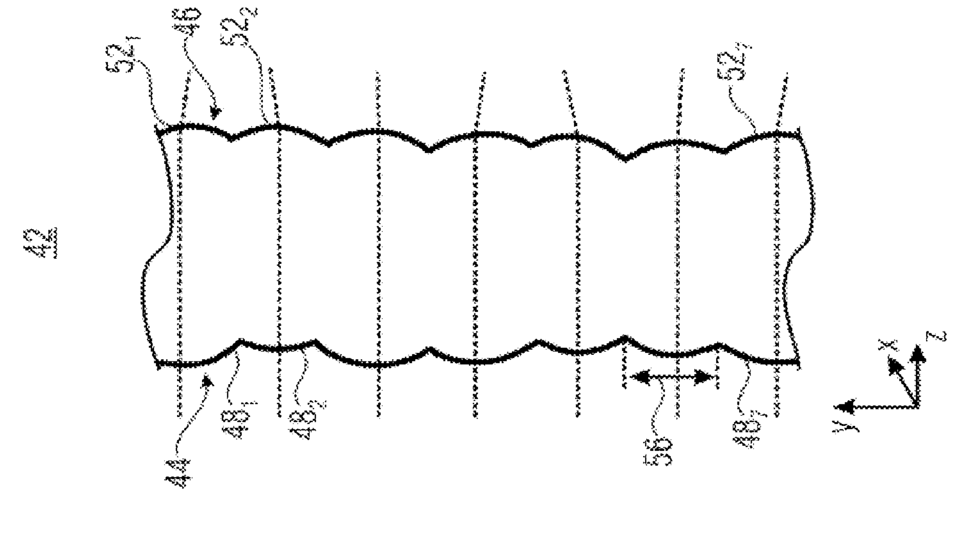
FIG. 3*a* shows a schematic side sectional view of a beamformer of the beamforming optics according to an embodiment.

FIG. 3a shows a schematic side sectional view or a vertical section of the beamformer of the beamforming optics 42 or a section thereof, while FIG. 3b shows a schematic top view of the beamforming optics 42 as a horizontal section of the beamformer, or of the section of the central area corresponding to FIG. 3a.

FIGS. 3a and 3b each only show part of the beamforming optics 42 or the condenser lens array 44 and 48 with some condenser lenses $\mathbf{48}_1$-$\mathbf{48}_7$ in FIGS. 3a, and $\mathbf{48}_{11}$ to $\mathbf{48}_{17}$ in FIG. 3b, as well as an assigned projection lens $\mathbf{52}_1$-$\mathbf{52}_7$ and $\mathbf{52}_{11}$ to $\mathbf{52}_{17}$, respectively.

One input condenser lenslet $\mathbf{48}_1$-$\mathbf{48}_7$ each and one assigned output projection lenslet $\mathbf{52}_1$-$\mathbf{52}_7$ each may form a channel of the honeycomb condenser, analogous explanations apply for lenses $\mathbf{48}_{11}$ to $\mathbf{48}_{17}$ and $\mathbf{52}_{11}$ to $\mathbf{52}_{17}$ in FIG. 3b. In the illumination optical path, the condenser lenslet 48 images the light source 34 into the respectively assigned projection lenslet 52, which may be referred to as Köhler illumination, while the projection lenslet 52 is able to image the respectively assigned condenser lenslet 48 in the imaging optical path towards infinity. The superimposition (overlap) of these images forms the far-field of the honeycomb condenser. The arrangement of the channels in an irregular rectangular grid may enable simple separation of controlling the horizontal and vertical intensity distributions.

As illustrated in FIG. 3b, the horizontal pitch of the output array 46 may be slightly larger along the direction x than that of the input array 44 in order to line up the images of the source in the output array 46 in the horizontal direction so as to fill the area despite the fact that the main beam angle to the optical axis 54 also increases with increasing horizontal distance.

Through this arrangement, the output horizontal divergence of the beamformer may be higher than that of each individual honeycomb condenser channel. Each column of the honeycomb condenser array may generate an intensity column in the far field. There, the intensity columns may overlap in the horizontal direction. According to the design approach of the irregular honeycomb condenser, as exemplarily described in [3] and [4], the horizontal beamforming may occur by individually different widths of the condenser lenslet columns and a horizontal displacement of the vertex of the projection lenslets 52, here in the interaction with the horizontal far-field distribution of the collimated light source.

A decentered arrangement, i.e. a displacement of the vertices of the projection lenslets 52 for beamforming, may be configured so as to be constant within one column to simplify manufacturing and avoid profile height differences between neighboring lenslets causing stray light; however, it may also vary within a column. Advantageously, horizontal beamforming is mostly realized by the source distribution formed by the field lens $\mathbf{36}_1$ in order to be able to use the honeycomb condenser in as unrestricted a manner as possible for the significantly more difficult vertical beamforming. However, accepting corresponding efforts, one can also deviate from this.

On the basis of the vertically collimated light source illustrated in connection with FIG. 2a, vertical beamforming may be carried out by an irregular implementation of the array channels in each column along the vertical direction on the basis of the design principles described in [3] and [4], as exemplarily illustrated in FIG. 3a. This may include the following:

- different vertical aperture sizes 56 and/or decentered aperture arrangements of the input lenslets at a constant vertical vertex position of the lenslet in the channel axis; and
- irregular vertical vertex positions of the output lenslets within a vertically regular aperture array.

According to embodiments, each lenslet column may include an individual configuration of input apertures and output vertices that the vertical intensity distribution generates at the corresponding horizontal position in the far field. This may help achieve the 2D far-field distribution with different vertical positions of the light/dark border on the left and right sides, with mostly identical distribution below the horizon.

Figure 3C:
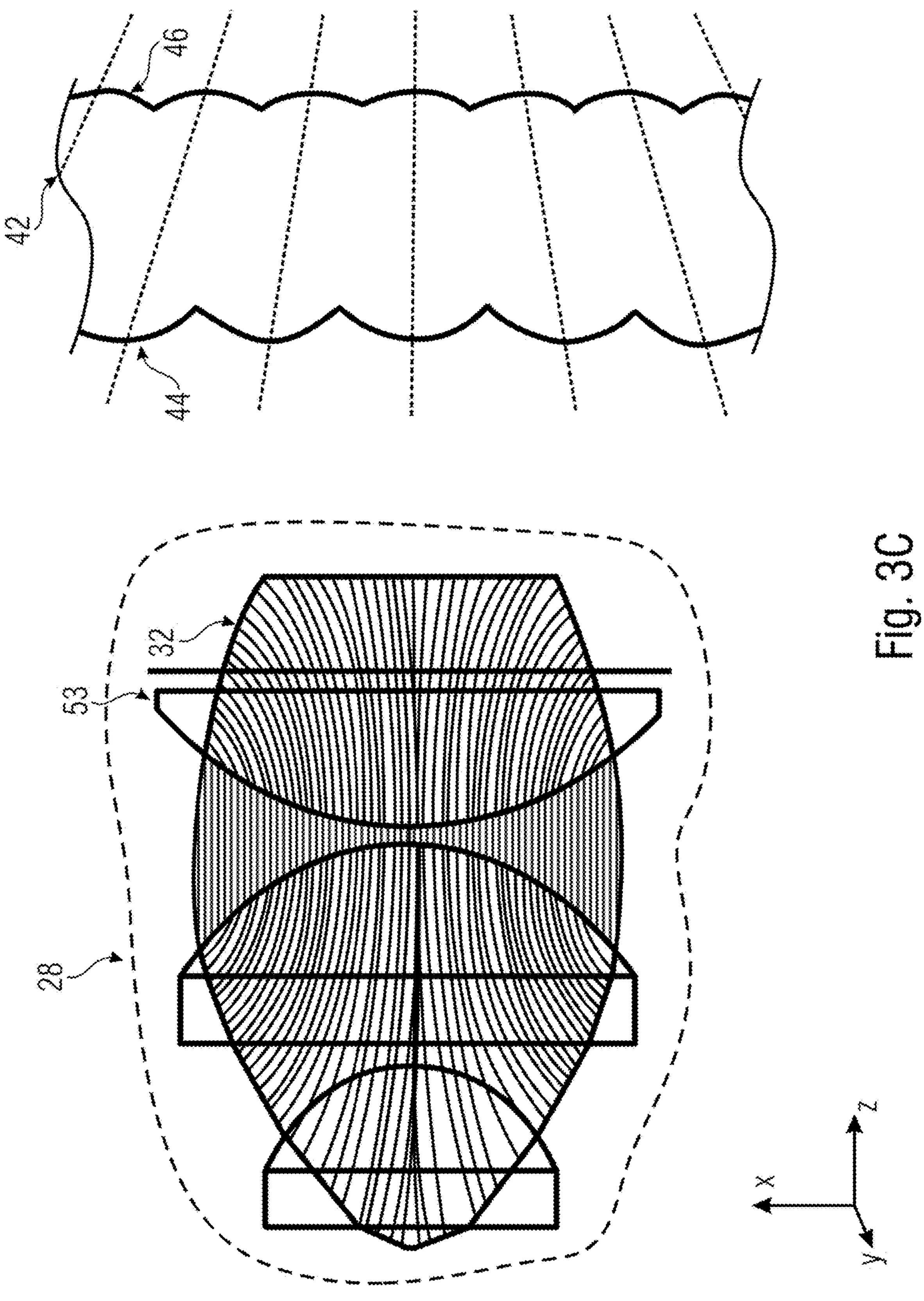
FIG. 3*c* shows a schematic side sectional view of a low-beam headlight according to an embodiment, wherein the light source arrangement may be configured to provide the light of the light cone such that the same is more divergent along a first transverse direction than along a second transverse direction.

FIG. 3c shows a schematic side-sectional view of a low-beam headlight 30 according to an embodiment in which the light source arrangement 28 may be configured to provide the light of the light cone 32 such that, in contrast to what is shown in FIG. 2b, the same is more divergent along the first transverse direction y, i.e. more propagated, than along the second transverse direction x. For example, the light source arrangement 28 may be configured to carry out convergence of the light cone 32 along the transverse direction x by means of optics 53. The relative positioning of the condenser lenses of the condenser lens array 44 with respect to the projection lenses of the projection lens array 46 or vice-versa may be adjusted according to the varied progression of the optical paths.

In a low-beam headlight according to an embodiment, the light source arrangement may be provided for generating a light cone 32 made of light so as to provide the incident light for the beamforming optics 42. The light cone may have an aspect ratio with respect to the first transverse direction y and the second transverse direction x that has a value of 1 or a value deviating therefrom, e.g., at least 2, at least 3, at least 5, at least 10 or more, which each is to be understood in the sense of 2:1 or 1:2 and vice-versa, i.e. also the reciprocal value.

Figure 4:
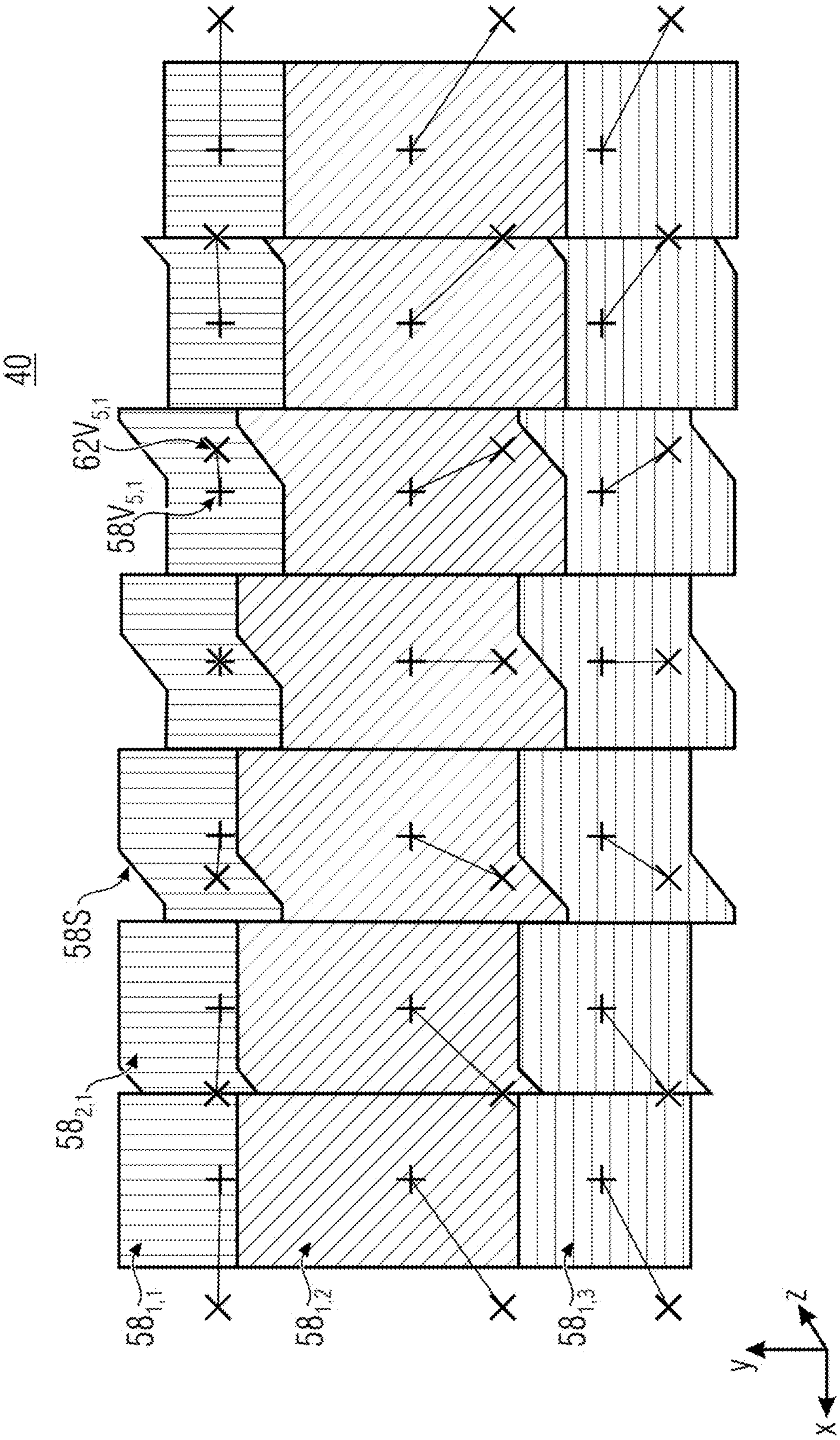
FIG. 4 shows a schematic top view of a known beamformer.

FIG. 4 shows a schematic top view of a known beamformer 40 that is to serve as a basis for later descriptions with respect to the present invention.

Condenser lenses $\mathbf{58}_{i,j}$ may be arranged in columns i and lines j and may have vertices $\mathbf{58}V_{i,j}$. Oblique portions $\mathbf{58}S_{i,j}$ may extend so as to be offset with respect to each other along the y-direction and in parallel to each other. As described on the basis of FIGS. 3*a* and 3*b*, a constant offset of the vertices 58V with respect to assigned vertices $\mathbf{62}V_{i,j}$ may occur along the respective column i in the x-direction and may differ along the y-direction, which is why the offset, or the decentered arrangement, along the first transverse direction may be line-dependent, and the same may be column-dependent along the second transverse direction. An assignment of vertices 58V of the condenser lenses with respect to vertices 62V of the projection lenses is illustrated on the basis of the dotted lines 59.

Beamforming of the elbow-shoulder region in the central area of the honeycomb condenser may be carried out by using a specially formed octagonal boundary of the condenser lenslets arranged in a rectangular grid in the central area of the tandem array illustrated in FIG. 4, when viewed from the direction of the light source. In the central area, lenslets of the condenser lens array may be found with a bend in the upper and lower boundaries. The vertices of the condenser lenslets 58 are horizontally located approximately in the center of the respective channel.

The vertex positions $\mathbf{62}V_{i,j}$ of the respectively assigned projector lenslets 62 are displaced column-by-column with respect to the respective condenser vertices in a horizontal direction so as to enable as straight a passage of the central beam through the channel in the horizontal direction as possible. The lateral offset of the respective projector vertex relative to the bend below (negative y direction) is identical in the known approach for all channels in the x and y-directions so that this bend is imaged for all channels in a precisely overlapped manner in the far field as the elbow-shoulder area of the light/dark border.

In other words, FIG. 4 shows a view of a section of a central area of a known condenser array when viewed from the direction of the collimated light source.

Figure 5A:
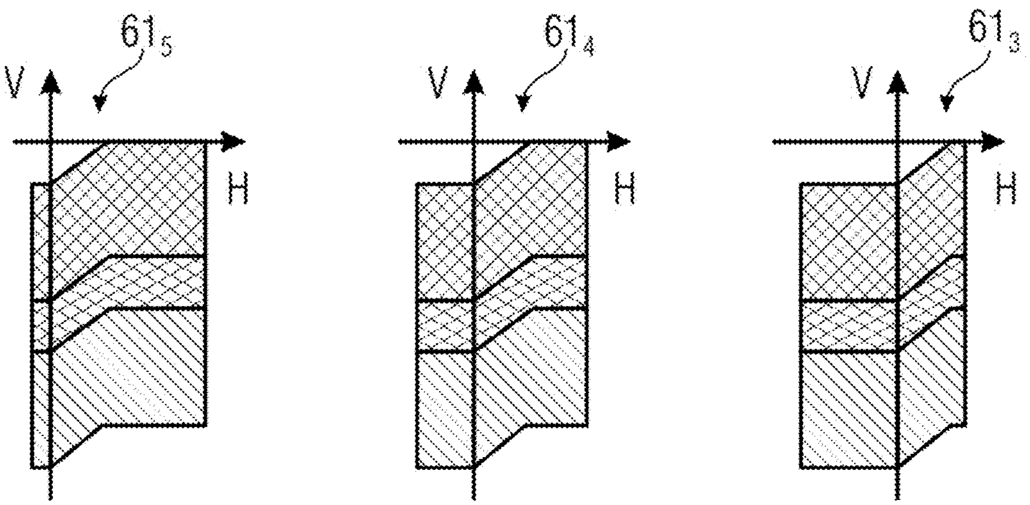
FIG. 5*a* shows the far-field distributions generated by the three central columns of FIG. 4.

FIG. 5*a* shows the far-field distributions $\mathbf{61}_3$, $\mathbf{61}_4$, and $\mathbf{61}_5$ generated by the three central columns i=3, 4, 5 of FIG. 4. The channel-wise different vertical offset between the projector vertex 62V and the bend located above (+y) or oblique portion 58S leads to the appearance of several elbow-shoulder artefacts, arranged one above the other, in the far-field distribution below (−y) the actual light/dark border. In other words, FIG. 5*a* shows a far-field distribution of the three center columns of the structure of FIG. 4.

Figure 5B:
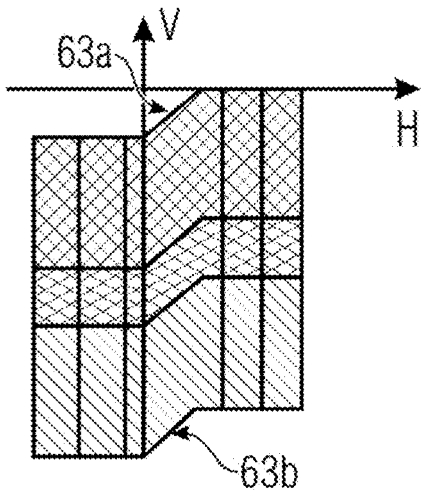
FIG. 5*b* shows a schematic illustration of a superimposition (or overlap) of the far-field distributions of FIG. 5*a;*

The superimposition of these three far-field distributions is shown in FIG. 5*b*. The images of the lower boundary edge of the condenser lenses, with respect to the channel axis, form in their superimposition the elbow-shoulder area of the light/dark border 63*a*, and the undesired images 63*b* of the respectively opposite boundary edge exemplarily form an artefact that is blurred in the vertical direction and located within the far-field distribution, resulting in an undesired distortion of the brightness distribution close to the intensity maximum. These undesired effects are addressed by the present invention.

Figure 6:
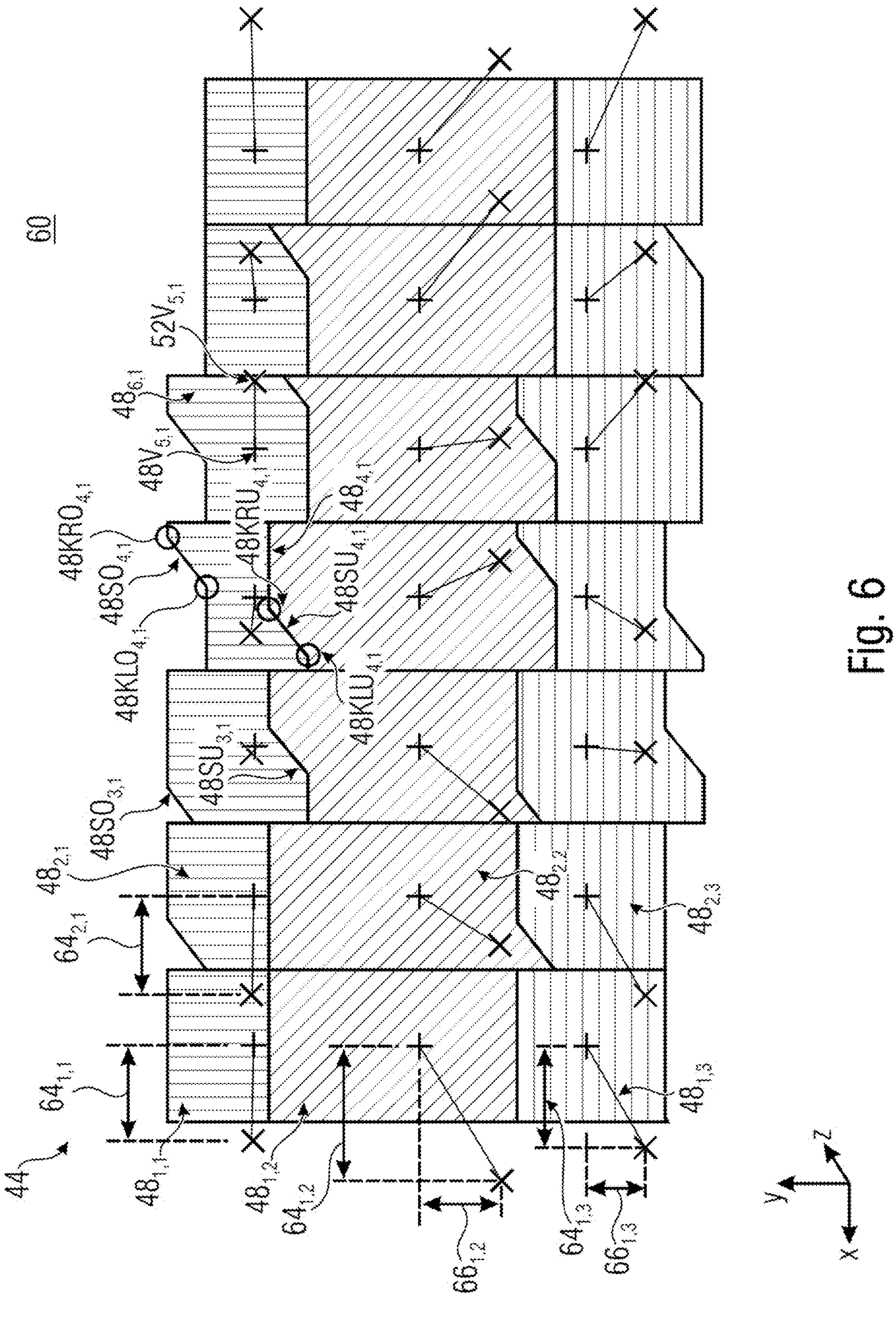
FIG. 6 shows a schematic top view of an optical beamformer according to an embodiment.

Based thereon, FIG. 6 shows a schematic top view of an optical beamformer 60 that may be used as the beamformer of the optics 42 in low-beam headlights described herein, e.g. as beamforming optics 42. The condenser lens array 44 indicates condenser lenses 48 indicated with matching indices i and j, and the projection lens array includes correspondingly indicated projection lenses 52. The vertex of the respective lens is indicated with the addition "V". The addition "SO" indicates an upper oblique edge and the addition "SU" indicates a lower one of the condenser lens.

Exemplarily, up and down (or upper and lower or above and below) is understood to be a position along the positive y-direction and the negative y-direction, with this only providing a reference for use as a low-beam headlight and its orientation or installation direction in the motor vehicle; however, with this not being limiting for the embodiments described herein.

An obliquely-extending portion 48SO and 48SU may be partially or fully contained in different columns i. A full implementation, such as $\mathbf{48}SO_{4,1}$ and $\mathbf{48}SU_{4,1}$, leads to two bends in the upper and lower boundaries of the condenser lens, respectively. According to an embodiment, the oblique portions are arranged so as to be offset with respect to each other along the second transverse direction x, cf. the condenser lens $\mathbf{48}_{4,1}$. This may also be described in such a way that corresponding bends in the boundaries, such as the two bends on the upper right side or the two bends on the lower left side, are accordingly arranged so as to be offset with respect to each other, i.e. an offset of the edge $\mathbf{48}SO_{4,1}$ occurs along the positive x-direction and along the negative y-direction, or vice versa. The indications "KLO", "KRO", "KLU", and "KRU" are used to indicate the respective bends "K" on the left "L" and on the right "R" as well as on top "O" or on the bottom "U". In this case, the bends on the upper right side and the lower right side are assigned to each other, and the bends on the upper left side and the lower left side are assigned to each other. According to an embodiment, the condenser lens array includes, at least in a central area, one or several columns in which a first and a second opposing boundary edge of a condenser lens is provided. These edges at least comprise one bend, cf. e.g. column i=2 compared to column i=4, wherein an adjustment with respect to the light/dark edge is provided by means of an obliquely-extending boundary edge. A bend of the first boundary edge, e.g. the upper one, is arranged so as to be offset with respect to a bend of the second boundary edge, e.g. the lower one, or vice versa, along the transverse direction x. This may help to avoid a superimposition of the light/dark edge in the far field, which supports the optical quality of the image.

Furthermore, FIG. 6 shows an embodiment of the present invention that may be implemented regardless of the displacement of the bends, or the oblique portions of the boundary edges. According to this embodiment, a first projection lens assigned to a first condenser lens of a column of the matrix arrangement of the condenser lenses in several columns and several lines is, compared to a different projection lens of the same column, decentered differently with respect to the assigned condenser lens along the second transverse direction x. For example, this is shown on the basis of the decentered arrangements or displacements 64 of column i=1. The displacement $\mathbf{64}_{1,2}$ differs from the displacements $\mathbf{64}_{1,1}$ and $\mathbf{64}_{1,3}$.

Optionally, but not necessarily, the displacements $\mathbf{64}_{1,1}$ and $\mathbf{64}_{1,3}$ may be equal. Due to these different decentered arrangements, a superimposition of the light/dark edge may also be avoided. As shown on the basis of the condenser lenses $\mathbf{48}_{2,1}$ and $\mathbf{48}_{1,3}$, two opposite boundary edges do not need to be adapted to the obliquely-extending light/dark edge 26, even if this is possible without any problems, as exemplarily shown for the condenser lens $48_{6,1}$. A corresponding oblique portion of the boundary edges may not only enable an adaptation of the condenser lens with respect to the obliquely-extending light/dark edge, but may also be arranged so as to be displaced along the transverse direction x between an upper boundary edge (+y) and a lower boundary edge (−y).

This may also be expressed such that condenser lenses of a column of at least one central area of the condenser lens array comprise opposite boundary edges that extend having at least one bend. A progression may essentially be along the transverse direction x and may be oblique at least in portions so as to enable the adaptation with respect to the obliquely-extending light/dark edge of the low-beam light. At least one of the bends of the first boundary edge may be arranged so as to be offset with respect to a corresponding bend of the second boundary edge along the transverse direction x. Thus, several columns of the overall array may be adapted with respect to the obliquely-extending light/dark edge, while outer areas possibly do not have such a feature.

As shown on the basis of FIG. 6, a vertex of a condenser lens may be individually decentered along the direction x with respect to a vertex of a projection lens assigned to the same, wherein, only exemplarily, the middle line deviates from a line above or below, in which the decentered arrangements of the above or below line are configured so as to be matching, at least along the direction x. This may be described such that a displacement of projection lens vertices 32V with respect to a condenser lens vertex 48V of a condenser lens 48 respectively assigned to the projection lens 52 is line-dependent and column-independent along the transverse direction y and line-independent and column-dependent along the transverse direction x.

By accordingly adapting the condenser lenses and the projection lenses with respect to each other, the use of an additional diaphragm may be omitted, and a low-beam light without diaphragm may be provided.

According to an embodiment, the corresponding boundary edge of a condenser lens may specify a progression of a boundary edge of a neighboring condenser lens of the same column, as is exemplarily shown for the border between the condenser lenses $48_{2,2}$ and $48_{2,3}$. This results in a different configuration of a condenser lens neighboring in the column due to the fact that the positioning of the bends is arranged so as to be offset with respect to the upper and lower boundary edge of a condenser lenslet.

At least a subset of condenser lenses 48 of the condenser lens array may be formed as anamorphic lenses. Regardless, at least a subset of projection lenses of the projection lens array may be formed as anamorphic lenses, in particular, in the outer area of the honeycomb condenser.

In order to avoid deformation of the hotspot described on the basis of FIGS. 4, 5*a*, and 5*b*, the horizontal position of the bend in the upper boundary may be arranged so as to be displaced relative to the lower bend of the respective channel, as illustrated on the basis of FIG. 6. A possible lateral displacement of the elbow/shoulder region in the projection of the channel located above may be achieved by individual horizontal decentered arrangement of the projection vertex of the channel. This means that, according to embodiments, a decentered arrangement of the projection lenses along the transverse direction x may be adapted to a displacement of the boundary edges along the transverse direction x, and may at least partially compensate for a displacement of the light/dark edge in the light/dark distribution caused by the displacement of the boundary edges.

Figure 7A:
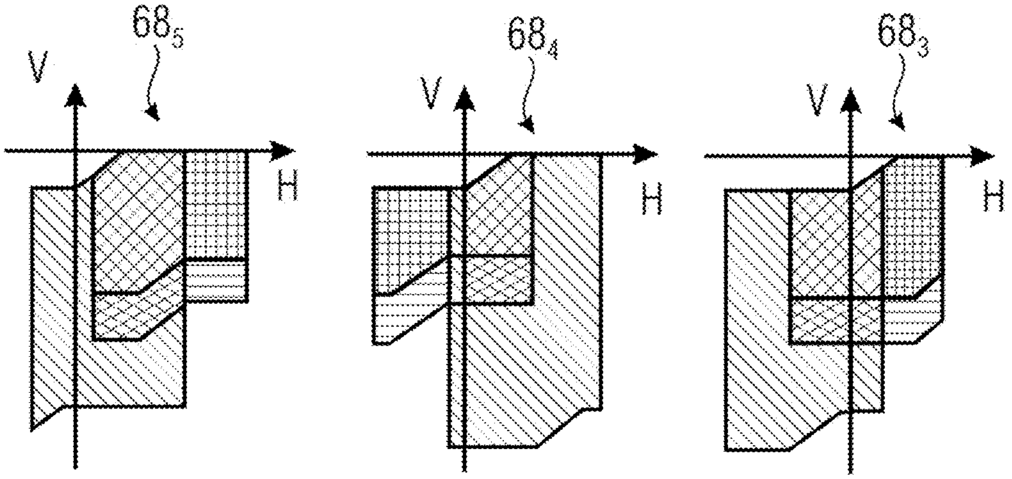
FIG. 7*a* shows schematic illustrations of far-field distributions of the beamformer of FIG. 6.
Figure 7B:
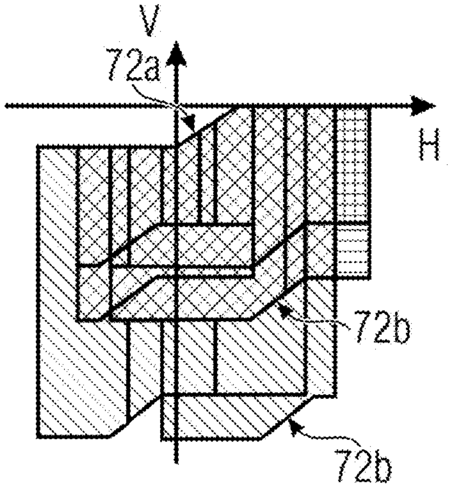
FIG. 7*b* shows a schematic illustration of a superimposition of the far-field distributions of FIG. 7*a;*

Compared to FIG. 5*a*, FIG. 7*a* shows an exemplarily far-field distribution $68_3$, $68_4$ and $68_5$ for columns i=3, 4, 5 of the beamformer 60. FIG. 7*b* shows a schematic illustration of a superimposition of the far-field distributions $68_3$, $68_4$, and $68_5$. While the upper edge 72*a* may be imaged aligned and sharply, interfering artifacts 72*b* may be decentered column-by-column horizontally with respect to each other in lower edge, which enables good suppression of a distortion of the intensity profile and position and which is advantageous.

In order to achieve the best possible blurring of the image of the lower shoulder, the horizontal positions of the upper and lower bends of each input lenslet may have the largest possible distance with respect to each other, i.e. the condenser lenses may be implemented accordingly. For example, this may be achieved by an alternating arrangement within a column I, according to FIG. 8*a*. A distance between bends or centers of the boundary edges of the transverse direction x may be, as illustrated in FIG. 8*a*, a maximum, at least within a tolerance range of ±10%, ±20% or ±30%. A position of the bends KRO, KRU and the other bends may depend on a position of the column in the matrix, cf. the different positions in the beamformer 60. According to an embodiment, a magnitude value of a distance 74 by which the bend KRO of the upper boundary edge is offset with respect to the corresponding bend KRU of the lower boundary edge along the transverse direction x may be constant within a column, such as illustrated in FIG. 8*a*. For different columns, the magnitude value of the distance 74 may be implemented so as to be different or individual. A direction of displacement may alternate for neighboring condenser lenses 8i=1, . . . , 5 of column i.

Figure 8B:
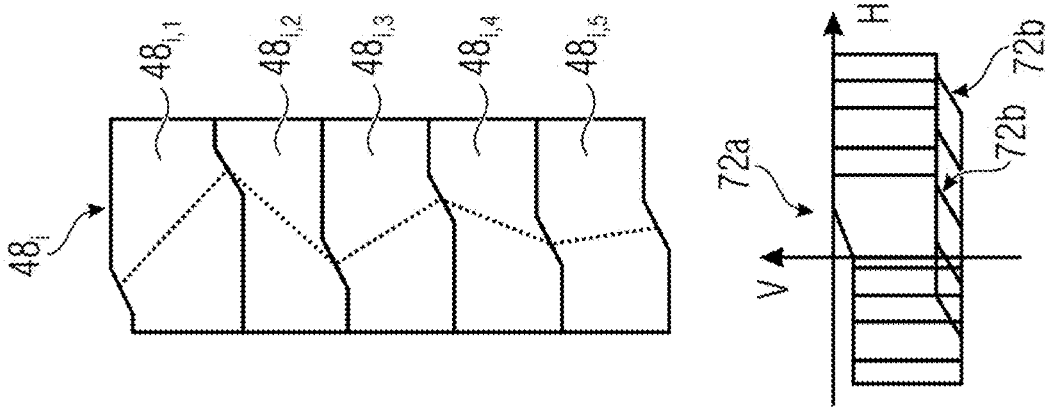
FIG. 8*a-b* show schematic illustrations of possible alternating arrangements of condenser lenses in a condenser lens array column according to embodiments.
Figure 8A:
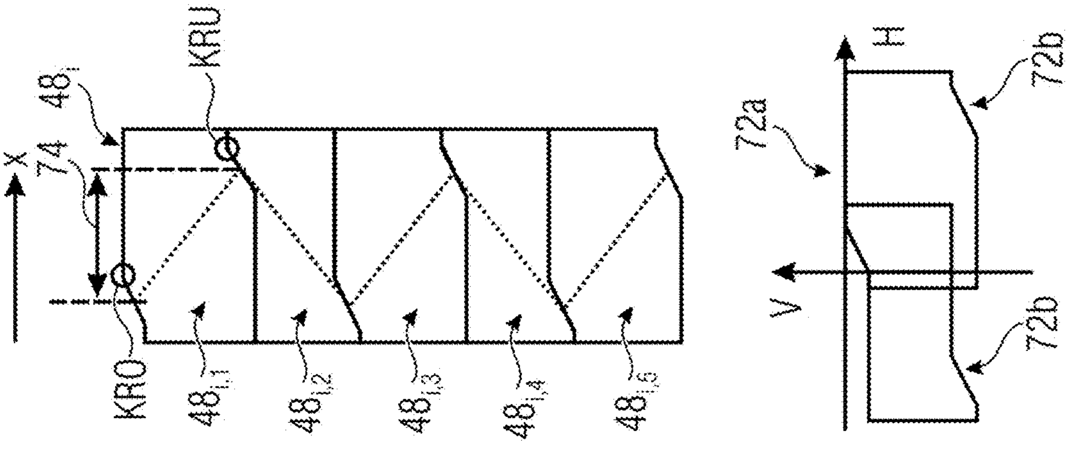

The configuration according to FIG. 8*b* also illustrate an alternating arrangement, in which the magnitude value of the displacement is not constant within the row, but is individual or at least different, in order to enable the best possible horizontal blurring of the artifacts, even if this is possibly accompanied by an increased implementation effort. Due to an increased number of positions of weaker partial artifacts, the far-field distribution 72*b* of FIG. 8*b* shows advantages over the far-field distribution 72*b* of FIG. 8*a*.

While FIG. 8 shows an arrangement of the bends in the lenslet boundaries that alternates channel-by-channel, FIG. 8*b* shows an alternating arrangement with a variable horizontal distance between the upper and lower bends in the boundary of each lenslet.

In order to minimize jumps (or gaps) in the output or projector array, the direction of the displacement of neighboring columns may also alternate, since the decentered arrangements of the projector vertices can be compensated in such a way and a profile without almost any jumps may be achieved. The transition between lenslet gaps imaging the shoulder and those only illuminating outer areas may be configured so as to be continuous. That is, in addition to the columns of a central area illustrated in FIG. 6, additional columns may be provided. While different arrays are joined in [2], a uniform array may be provided for the present invention insofar as some columns, e.g. approximately a third, of several, in particular several ten columns up to more than 50, more than 70, more than 80, or more than 100 columns, are to be assigned to the central area. According to an embodiment, the array may comprise approximately 130 columns from which approximately 20 to 25 columns and/or a percentage of at least 10% and at most 30% or of at least 15% and at most 25% or approximately 20% may be assigned to the central area. The overall array may be configured such that only part of the lenslets image the shoulder-elbow area in the central area, so that stray-like artifacts of the interfaces between the different array regions are avoided in comparison to the known approach from [2].

Similar to the implementations from [2], the condenser lens array may comprise a first, a second, and a third condenser lens area, wherein the second condenser lens area is arranged between the first and the third condenser lens array area, e.g. as a central area, and includes a column with adapted oblique edges. In a transition area to the outer areas or at least one of them, only part of the condenser lenses may image the obliquely-extending light/dark edge so as to enable the above-mentioned continuous transition.

Embodiments enable the implementation of the condenser lens array and the projection lens array as a monolithic regular tandem array. Possibly, but not necessarily, the condenser lens array is configured such that columns of identical column width and lines of individually different line heights are implemented and the condenser lenses are arranged so as to fill the area and particularly comprise a matrix arrangement in lines and columns, enabling simple manufacturing. In another implementation, the condenser lens array may comprise columns of identical column width and lines with line heights that vary individually according to the column, in which the condenser lenses are arranged. This may be accompanied by a more complex production, but has the advantage that towards an outer area, i.e. with increasing distance from a central axis, a reduced brightness may be compensated for by adapting the distribution of the condenser lenses accordingly.

According to an embodiment, condenser lenses, at least those with an obliquely-extending boundary edge, may be formed as decentered condenser lenses. Alternatively or additionally, the projection lens array may comprise at least one projection lens that is decentered along the transverse direction y. Projection lenses of the projection lens array may be arranged with a greater pitch along the transverse direction x than condenser lenses of the condenser lens array. The pitch may be formed to match along the transverse direction y.

Embodiments of the present invention relate to aberration correction and/or stray light minimization. In order to achieve sharp images with the light source into the output lenslets (Köhler illumination) as well as of the apertures of the input lenslets through the output lenslets to infinity, the focal lengths of the lenslets may vary in the horizontal and vertical directions, for example by providing anamorphic lenses. Alternatively of additionally, a variation may be implemented not only within a lenslet, but also across the array. Due to the different apertures of the input lenslets, there may be jumps in the height profile of neighboring lenslets. These jumps may undesirably refract and/or scatter light as interfering edges and may therefore cause localized interfering light artifacts in the output distribution. For this reason, embodiments provide for an equalization of the height profiles, wherein corresponding design rules for achieving the smoothest possible profiles are listed in [5]. To avoid edges of jumps and thus interfering light, the neighboring lenslet columns should be as similar as possible. As the target distribution changes slowly and continuously, the differences between neighboring columns are small, which means that the jumps that occur may also be small.

In another way to minimize remaining edges of jumps is to slightly displace the vertices of the input lenslets in the z direction so that jumps in the height profile disappear as far as possible. The resulting defocusing in the illumination and imaging optical path may in principle be partially compensated for by having focal lengths of the lenslets adjusted on a channel by channel basis, but may also be negligibly small, so that such an adjustment is not necessary.

Returning to the illustration of FIG. 3*a*, present embodiments may be configured in such a way that condenser lens of the condenser lens array are arranged so as to be offset with respect each other along a light propagation direction (z) and their position may match with respect to a height profile.

According to an embodiment, condenser lenses may comprise focal lengths that are adapted to the offset position arranged in relation to each other on a channel-by-channel basis in order to at least partially compensate for individual defocusing.

According to an embodiment, projection lenses of the projection lens array may be arranged independently, but also in the interaction with the condenser lenses, so as to be offset with respect to each other along the light propagation direction, and a position may match with respect to a height profile.

Figure 9:
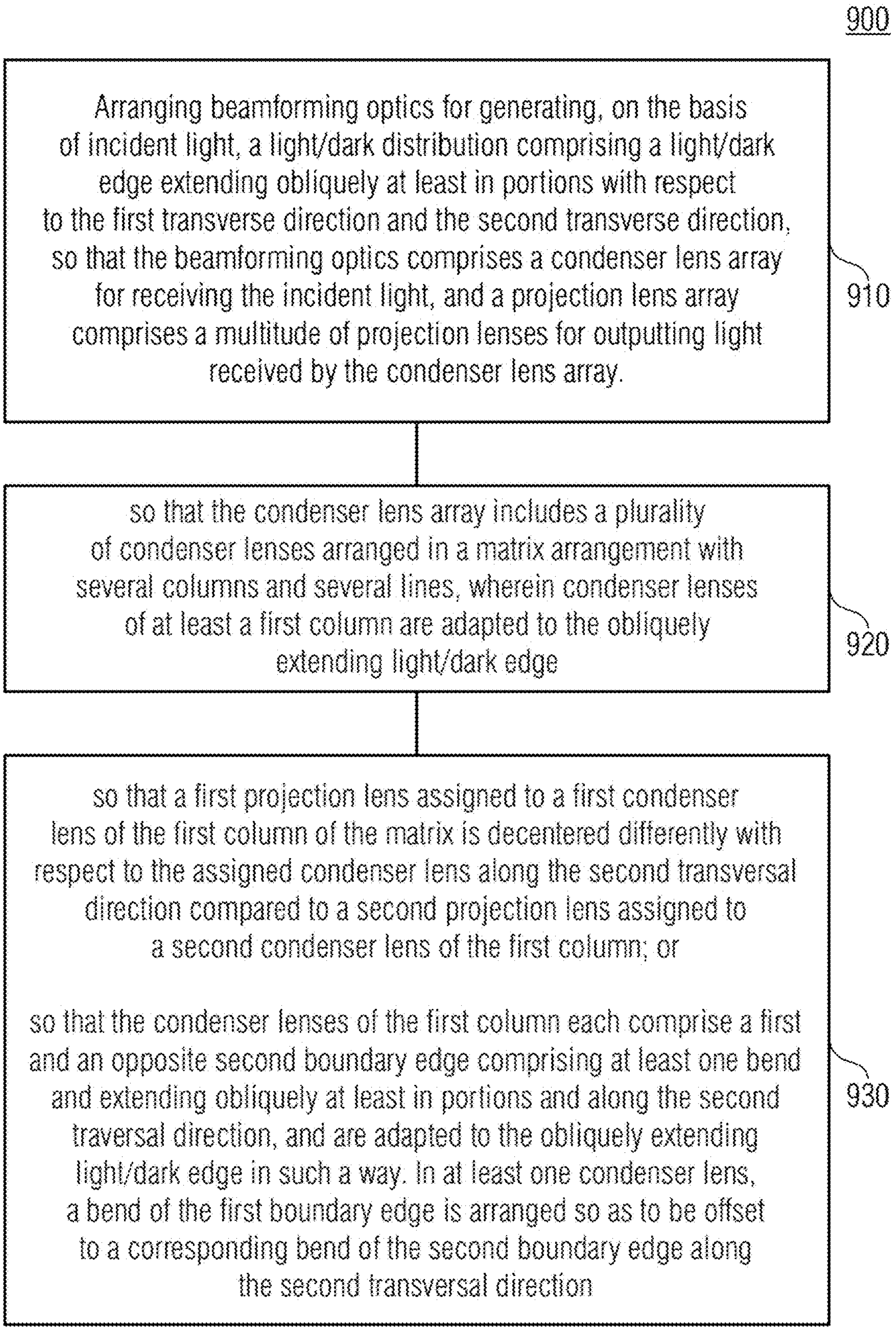
FIG. 9 shows a schematic flow diagram of a method according to an embodiment.
Figure 10:
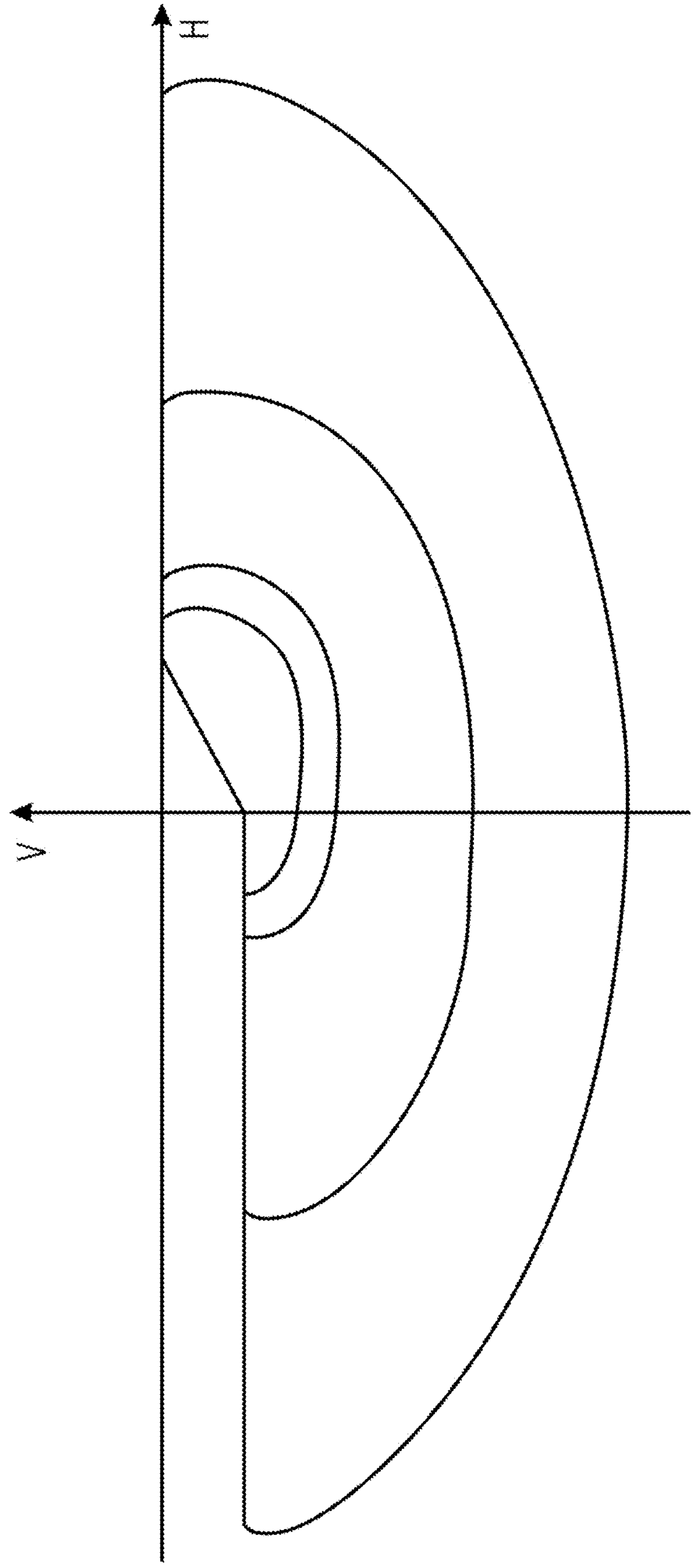
FIG. 10 shows a schematic illustration of the light/dark border when viewed in the driving direction in the case of right-hand traffic.

FIG. 9 shows a schematic flow chart of a method 900 that can be used to manufacture a low-beam headlight described herein. Step 910 includes arranging beamforming optics for generating, on the basis of light, a light/dark distribution comprising a light/dark edge extending obliquely at least in portions in the first transverse direction and the second transverse direction so that the beamforming optics comprises a condenser lens array for receiving the incident light and a projection lens array comprises a multitude of projection lenses for outputting light received by the condenser lens array. The light may be more divergent or less divergent along a first transverse direction than a second transverse direction perpendicular to the first transverse direction.

A boundary condition 920 for the method is that the condenser lens array includes a plurality of condenser lenses arranged in a matrix arrangement with several columns and several lines, wherein the condenser lenses of at least a first column are adapted to the obliquely-extending light/dark edge. A boundary condition 930 is that a first projection lens assigned to first condenser lens of the first column of the matrix is, compared to a second projection lens assigned to second condenser lens of the first column, decentered differently with respect to the assigned condenser lens along the second transverse direction; and/or that the condenser lenses of the first column each have a first and an opposite second boundary edge extending along the second transverse direction and comprising at least one bend and extending at least obliquely in portions, and are adapted with respect to the obliquely-extending light/dark edge in such a way, wherein, in at least one condenser lens, a bend of the first boundary edge is arranged so as to be opposite to a corresponding bend of the second boundary edge along the second transverse direction. Advantageously, this is accompanied by the fact that an individual decentered arrangement of the projection lenses with respect to the respectively assigned condenser lens along the transverse direction x is provided. Embodiments of the present invention enable partial or full absence of masks, which is why the system may have a very high transmission.

In addition, a production step may be omitted, since buried masks and beamformers do not need to be realized. By eliminating the absorbing masks, the heat input into the element may also be reduced, which may increase the service life. The omission of the three-part beamformer as in [4] may be reduced and enables better control of the horizontal far-field distribution in the outer areas, as well as the illumination of straylight artifacts caused by the joints between the three areas. For example, examples of embodiments may be arranged in vehicle low-beams to generate any desired far-field distribution in headlights.

A specific embodiment of the present invention comprises a low-beam headlight with an anamorphic collimated light source arrangement comprising a light source with a greater divergence along a second transverse direction than along a first transverse direction perpendicular thereto. The low beam headlight comprises a micro-optical beamformer without diaphragms, comprising a first condenser lens array with condenser lenses arranged in columns of identical width and rows of individually different height to fill the area, the condenser lenses being formed at least partially as lens segments decentered along the first transverse direction. Furthermore, a second projection lens array arranged behind the same along a light propagation direction is provided, comprising at least partially decentered projection lenses and having a greater pitch along the second transverse direction than the condenser lens array and an equal pitch along the first transverse direction, wherein each condenser lens images the light source into a projection lens assigned thereto, and each projection lens images the assigned condenser lens towards infinity, and thus forms a far-field distribution of the low-beam. Beamforming of the beamformer along the second transverse direction results at least in part from an interaction of a divergence distribution of the collimated light source arrangement along the second transverse direction and the beamforming of the lens arrays along the second transverse direction. Condenser lenses are equipped with a corresponding bend in opposite boundaries along the first transverse direction in a central area of the condenser lens array to generate an elbow-shoulder contour of a light/dark border in the far-field distribution. The positions of the bends along the second transverse direction are different for at least a subset of the condenser lenses of a condenser lens array column, and the assigned projection lenses comprise lens segments with different decentered arrangements along the second transverse direction.

Based on the optics scheme used [2], a low-beam headlight that may be designed so as to be completely without diaphragms and dispenses with the tripartition of the beamformer and the implementation of the outer segment as cylindrical honeycomb condenser is provided according to the invention. The advantages of this system compared to the concepts from [1] and [2] include: improve control of the horizontal intensity distribution in the outer left and right areas by means of beamforming by the irregular honeycomb condenser in conjunction with the horizontal far-field distribution of the source and improved straight light suppression.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A low-beam headlight, comprising:

beamforming optics for generating, on the basis of light, a light/dark distribution comprising a light/dark edge extending obliquely at least in portions with respect to a vertical first transverse direction and a horizontal second transverse direction perpendicular thereto, wherein the beamforming optics comprises a condenser lens array for receiving incident light; and a projection lens array with a multitude of projection lenses for outputting light received by the condenser lens array;

wherein the condenser lens array comprises a plurality of condenser lenses arranged in a matrix arrangement with several columns and several lines, wherein condenser lenses of at least a first column are adapted to the obliquely-extending light/dark edge;

wherein, compared to a second projection lens assigned to a second condenser lens of the first column, a first projection lens assigned to a first condenser lens of the first column of the matrix is decentered differently with respect to the assigned condenser lens along the second transverse direction.

2. The low-beam headlight according to claim 1, wherein the condenser lenses of the first column comprises a boundary edge extending obliquely along the first and the second transverse direction at least in portions, adapted to the obliquely-extending light/dark edge.

3. The low-beam headlight according to claim 2, wherein the condenser lenses of the first column comprise a first and an opposite second boundary edge, each extending obliquely along the first and second transversal direction at least in portions and adapted to the obliquely-extending light/dark edge.

4. The low-beam headlight according to claim 3, wherein an oblique portion of the first boundary edge is arranged so as to be displaced with respect to an oblique portion of the second boundary edge along the second transverse direction.

5. The low-beam headlight according to claim 1, wherein condenser lenses of the first column each comprise a first and an opposite second boundary edge extending along the first and second transverse directions and comprising at least one bend and extending obliquely at least in portions, and adapted to the obliquely-extending light/dark edge in such a way;

wherein, in at least one condenser lens, a bend of the first boundary edge is arranged so as to be offset with respect to a corresponding bend of the second boundary edge along the second transverse direction.

6. The low-beam headlight according to claim 5, wherein the condenser lens is a first condenser lens and the second boundary edge of the first condenser lens specifies a progression of a first boundary edge of a neighboring second condenser lens or the first column;

wherein the second condenser lens comprises a second boundary edge opposite the first boundary edge, comprising at least one bend along the first and second transverse direction and extending obliquely at least in portions, and adapted to the obliquely-extending light/dark edge in such a way;

wherein the bend of the second boundary edge of the second condenser lens is arranged so as to be offset with respect to the bend of the first boundary edge of the second condenser lens along the second transverse direction.

7. The low-beam headlight according to claim 5, wherein a distance magnitude value by which the bend of the first boundary edge is arranged so as to be offset with respect to the corresponding bend of the second boundary edge along the second transverse direction is constant within the first column and is different or individual for different columns of condenser lenses in the condenser lens array adapted to the obliquely-extending light/dark edge.

8. The low-beam headlight according to claim 5, wherein a vertex of a projection lens assigned to the condenser lens is decentered individually with respect to a vertex of the projection lens along the second transverse direction.

9. The low-beam headlight according to claim 5, wherein a different decentered arrangement of the first projection lens, compared to the second projection lens, along the second transverse direction, is adapted to a displacement of the boundary edges along the second transverse direction and at least partially compensates for a displacement of the light/dark edge in the light/dark distribution caused by the displacement of the boundary edges.

10. The low-beam headlight according to claim 1, wherein a displacement of projection lens vertices with respect to a condenser lens vertex of a condenser lens respectively assigned to the projection lens is line-dependent and column-independent along the first transverse direction and line-independent and column-dependent along the second transverse direction.

11. The low-beam headlight according to claim 1, wherein condenser lenses of a plurality of columns of the condenser lens array are adapted to the obliquely-extending light/dark edge; wherein the plurality of columns forms a centrally arranged area of the condenser lens array.

12. The low-beam headlight according to claim 1, wherein the condenser lens array comprises a first, a second, and a third condenser lens array area, wherein the second condenser lens array area is arranged between the first and third condenser lens array areas and comprises the first column, wherein only part of the condenser lenses images the obliquely-extending light/dark edge in a transition area from the second condenser lens array area, on the one hand, and the first or third condenser lens array area, on the other hand.

13. The low-beam headlight according to claim 1, comprising a light source arrangement for generating a light cone of light so as to provide the incident light for the beamforming optics.

14. The low-beam headlight according to claim 13, wherein the condenser lens array is arranged so as to sharply image the light source arrangement into the projection lens array in order to provide a Köhler illumination.

15. The low-beam headlight according to claim 1, wherein at least the first column comprises decentered condenser lenses along the first transverse direction; or wherein the projection lens array comprises at least one projection lens decentered along the first transverse direction.

16. A low-beam headlight, comprising:

a light source arrangement for generating a light cone of light that is less divergent in a first transverse direction than in a second transverse direction perpendicular to the first transverse direction; and with one of beamforming optics for generating, on the basis of light, a light/dark distribution comprising a light/dark edge extending obliquely at least in portions with respect to the first transverse direction and the second transverse direction, wherein the beamforming optics comprises a condenser lens array for receiving incident light; and a projection lens array with a multitude of projection lenses for outputting light received by the condenser lens array;

wherein the condenser lens array comprises a plurality of condenser lenses arranged in a matrix arrangement with several columns and several lines, wherein condenser lenses of at least a first column are adapted to the obliquely-extending light/dark edge;

wherein condenser lenses of the first column each comprise a first and an opposite second boundary edge extending along the first and second transverse directions and comprising at least one bend and extending obliquely at least in portions, adapted to the obliquely-extending light/dark edge in such a way;

wherein, in at least one condenser lens, a bend of the first boundary edge is arranged so as to be offset with respect to a corresponding bend of the second boundary edge along the second transverse direction;

or beamforming optics, wherein the beamforming optics is a micro-optical beamformer without diaphragms, comprising a first condenser lens array with condenser lenses arranged in columns of identical width and rows of individually different height so as to fill the area, the condenser lenses being formed at least partially as lens segments decentered along the first transverse direction; and a second projection lens array arranged behind the same along a light propagation direction, comprising at least partially decentered projection lenses, and comprising a greater pitch along the second transverse direction than the condenser lens array and an equal pitch along the first transverse direction, wherein each condenser lens images the light source into a projection lens assigned thereto, and each projection lens images the assigned condenser lens towards infinity; and thus forms a far-field distribution of the low-beam;

wherein beamforming of the beamformer along the second transverse direction results at least in part from an interaction of a divergence distribution of the collimated light source arrangement along the second transverse direction and the beamforming of the lens arrays along the second transverse direction;

wherein condenser lenses are equipped with a corresponding bend in boundaries opposite along the first transverse direction in a central area of the condenser lens array to generate an elbow-shoulder contour of a light/dark border in the far-field distribution; and the positions of the bends along the second transverse direction are different for at least a subset of the condenser lenses of a condenser lens array column, and the assigned projection lenses comprise lens segments with different decentered arrangements along the second transverse direction.

17. A beamforming optics for generating, on the basis of incident light, a light/dark distribution comprising a light/dark edge extending obliquely at least in portions with respect to a vertical first transverse direction and a horizontal second transverse direction perpendicular thereto, wherein the beamforming optics comprises:

a condenser lens array for receiving the incident light; and a projection lens array with a multitude of projection lenses for outputting light received by the condenser lens array;

wherein the condenser lens array comprises a plurality of condenser lenses arranged in a matrix arrangement with several columns and several lines, wherein condenser lenses of at least a first column are adapted to the obliquely-extending light/dark edge;

wherein, compared to a second projection lens assigned to a second condenser lens of the first column, a first projection lens assigned to a first condenser lens of the first column of the matrix is decentered differently with respect to the assigned condenser lens along the second transverse direction.

* * * * *